Nov. 29, 1960    E. R. SEWELIN    2,961,891
MOTOR VEHICLE STEERING COLUMN ASSEMBLY
Filed April 11, 1958    3 Sheets-Sheet 1
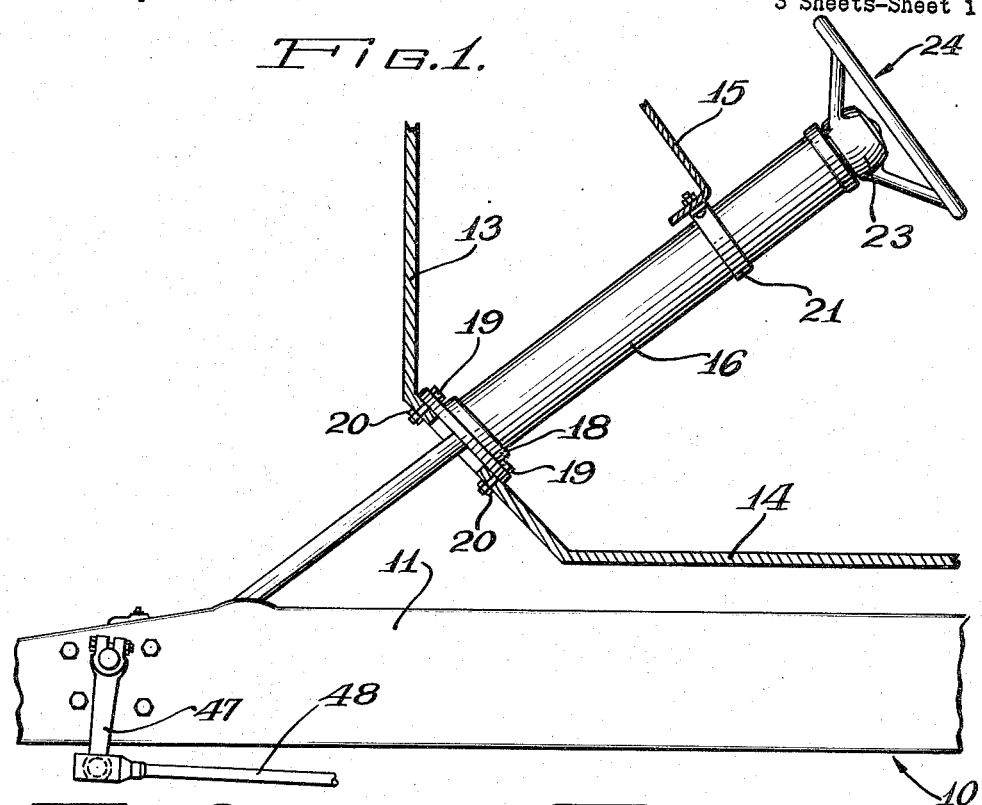
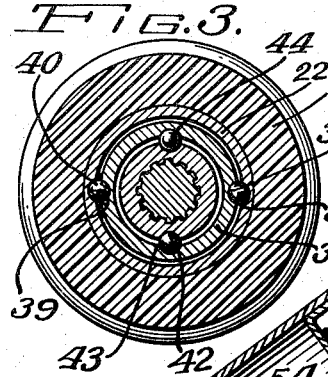
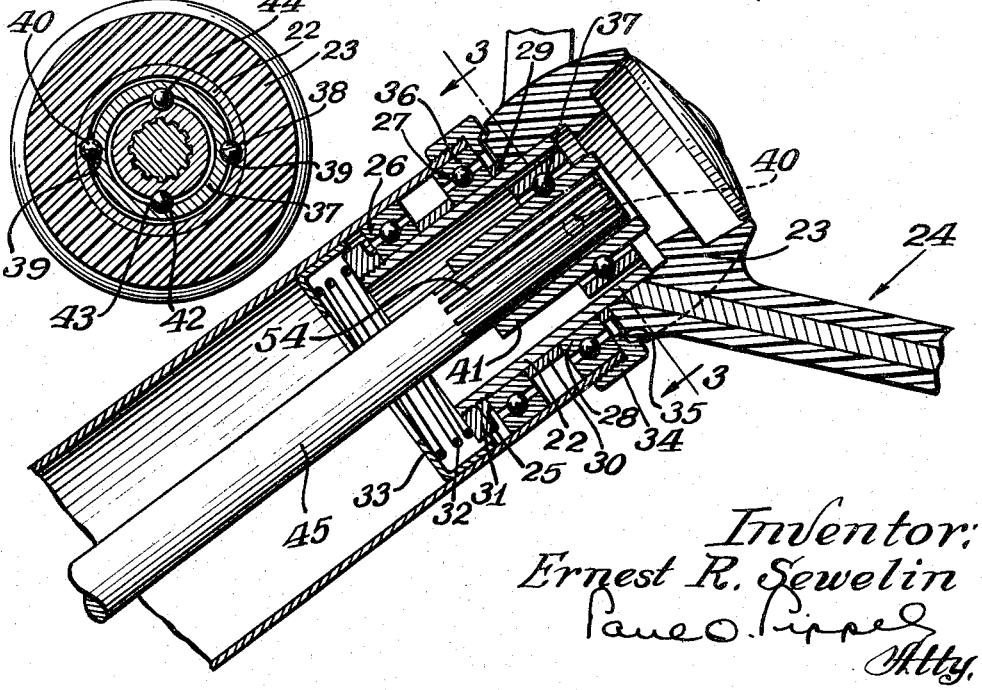
Inventor:
Ernest R. Sewelin
Atty.

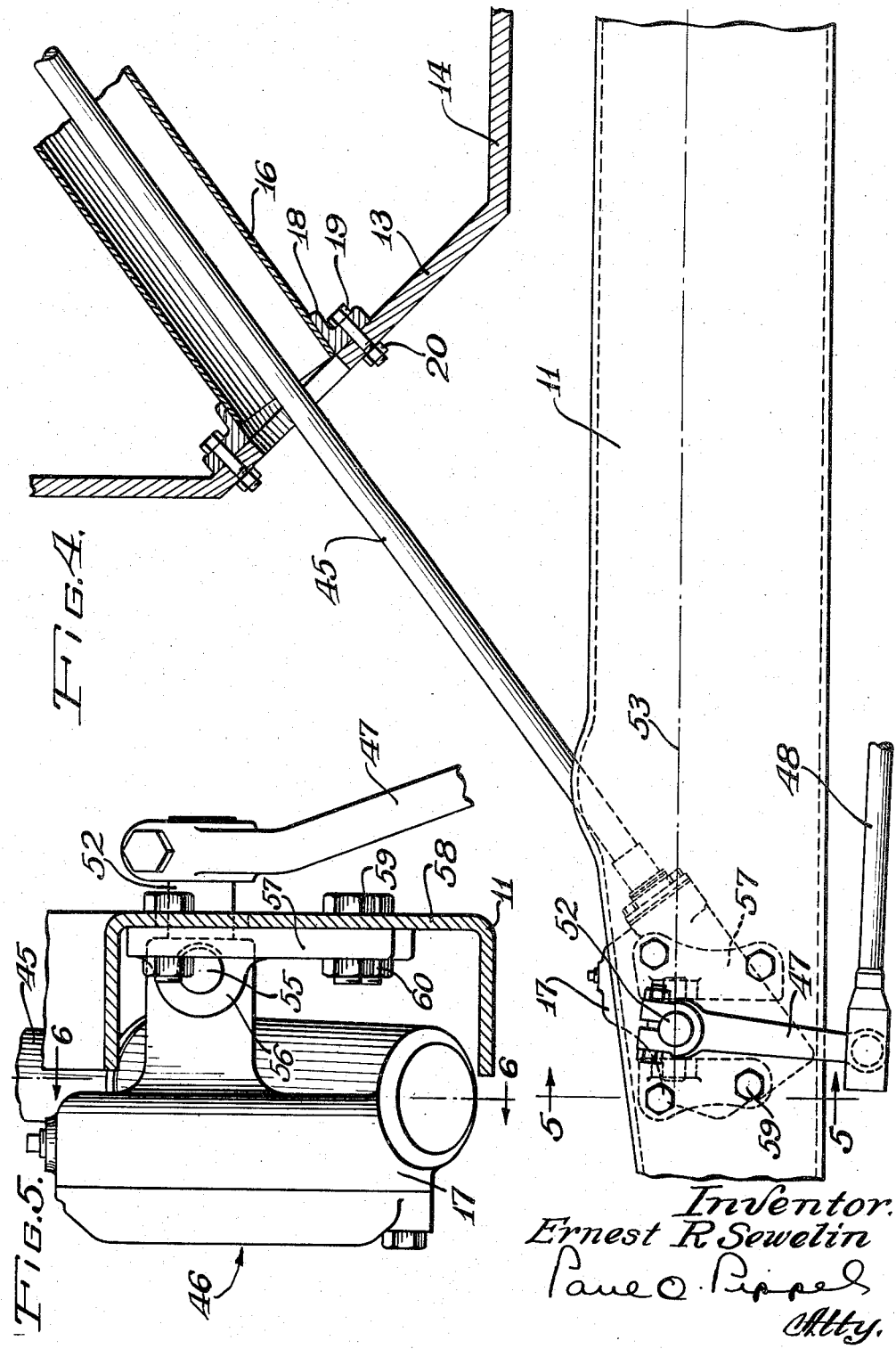

Nov. 29, 1960 E. R. SEWELIN 2,961,891
MOTOR VEHICLE STEERING COLUMN ASSEMBLY
Filed April 11, 1958 3 Sheets-Sheet 3
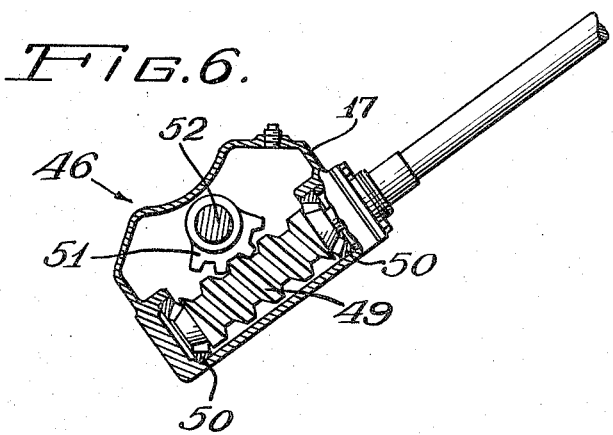
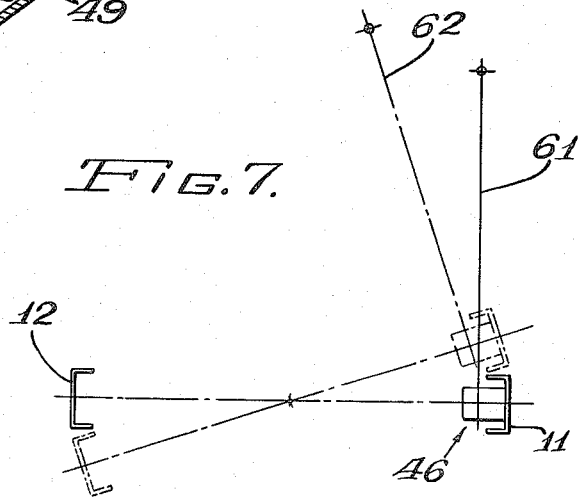
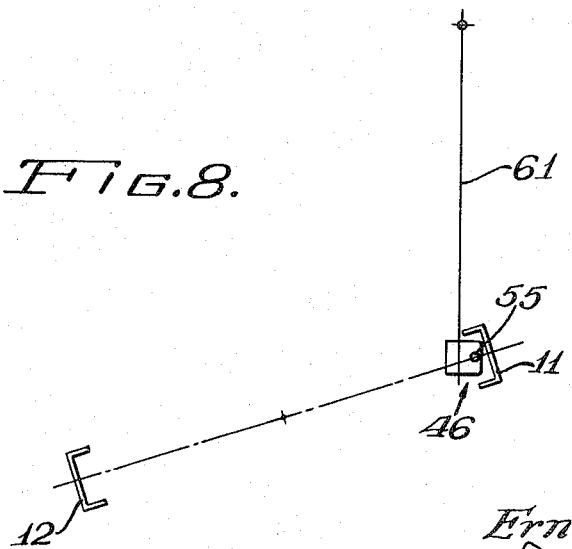
Inventor:
Ernest R. Sewelin
Paul O. Pippel
Atty.

United States Patent Office 2,961,891
Patented Nov. 29, 1960

2,961,891

MOTOR VEHICLE STEERING COLUMN ASSEMBLY

Ernest R. Sewelin, Waterloo, Ind., assignor to International Harvester Company, Chicago, Ill., a corporation of New Jersey Filed Apr. 11, 1958, Ser. No. 727,933

9 Claims. (Cl. 74—492)

This invention relates to motor vehicle steering mechanism and more particularly to a new and improved means for mounting a steering mechanism including the steering column, wheel, shaft and gear reduction unit on the vehicle.

It is generally the practice in the design and manufacture of automotive vehicles to mount the vehicle body on the chassis frame in such a manner that limited relative movement between the body and frame is permitted in order to mitigate the transmission of the vibration, shocks and strains to which the chassis frame is subjected during operation of the vehicle to the body. However, it is usually the custom to rigidly secure certain vehicle control devices such as the steering mechanism to both the chassis frame and the body. Basically a steering mechanism includes a gear reduction unit which is rigidly fastened to the chassis frame, a steering shaft which has one end drivingly connected to the gear reduction unit and at its opposite end provided with a steering wheel. A steering column encircles the steering shaft and has one end fixed to the gear reduction unit casing to be supported thereby and an intermediate portion thereof connected to the vehicle body. As a result the vibration, shocks and strain which the chassis frame is subjected to when operating the vehicle over an uneven terrain or surface irregularities are imparted directly to the steering wheel and steering column causing driver discomfort and oftentimes because if the severity of the relative movement between the body and chassis frame causes breakage of the components of the steering mechanism as well as the connections of the steering column to the chassis frame and vehicle body. It is therefore an important object of the present invention to provide a new and improved vehicle steering mechanism and novel means for supporting the steering mechanism on the vehicle whereby relative movement between the vehicle body and chassis frame does not adversely affect the operation of the steering mechanism and the forces, shocks and vibration to which the frame is subjected to are absorbed or dissipated by the mechanism without deformation, fatigue or breakage of the components of the mechanism or the supports therefor.

Another object of the invention is to provide a steering mechanism connected to the vehicle body and chassis frame in such a manner so as to prevent the conduction of noises and vibration from the chassis frame to the steering wheel.

A further object of the present invention is to rotatably support a steering wheel on a tubular column fixed to the vehicle body and to connect one end of the steering shaft to the vehicle body in such a manner that the steering shaft is permitted to move axially as well as angularly with respect to the steering wheel during operation of the vehicle without adversely affecting steering control of the vehicle.

Still a further object of the invention is to pivotally connect the gear reduction unit to the chassis frame whereby the gear reduction unit is capable of pivoting about a longitudinally extending axis with respect to the chassis frame which longitudinally extending axis is spaced from and parallel to the neutral axis of the chassis frame.

The foregoing and other important objects and desirable features inherent in and encompassed by the invention together with many of the purposes and uses thereof will become readily apparent from a reading of the ensuing description in conjunction with the annexed drawing, in which:

Figure 1 is a side elevational view of a portion of a vehicle steering mechanism;

Figure 2 is a fragmentary sectional view of the upper part of the steering column;

Figure 3 is a sectional view taken substantially along line 3—3 of Figure 2;

Figure 4 is a side elevational view, partially broken away, of a portion of the steering mechanism;

Figure 5 is a sectional view taken substantially along line 5—5 of Figure 4;

Figure 6 is a sectional view of the steering gear reduction unit taken substantially along line 6—6 of Figure 5;

Figure 7 is a diagrammatic front elevational view of a portion of the vehicle steering mechanism, the broken lines represent the position of the steering mechanism and side sill members when one of the side sill members is raised relatively to the other in prior art steering mechanism; and Figure 8 is similar to Figure 7 illustrating the position of the steering shaft when one side sill member is raised relatively to the other.

Referring to the drawings in detail wherein like reference characters represent like elements throughout the various views there is shown a portion of a vehicle chassis frame 10 which includes a pair of longitudinally extending channel shaped side sill members 11, 12. The vehicle body, partially shown in Figure 1, includes a fire wall 13 which has its lower edge jointed to a floor panel 14. The vehicle body also includes an instrument panel 15.

The steering mechanism of the present invention includes a tubular steering column 16 as in conventional steering gear mechanism. However, the steering column 16 instead of having its lower end rigidly fastened to the gear reduction unit casing or housing 17 is provided with a collar 18 which is rigidly secured to the fire wall 13 by any suitable means such as bolts 19 and nuts 20. The steering column 16 is also rigidly secured to the instrument panel 15 by means of a strap-like clamp 21.

As best shown in Figure 2 one end of a sleeve 22 is rigidly secured to the hub portion 23 of the hand steering wheel 24. The end of the sleeve 22 opposite the end thereof secured to the hub 23 is provided with external threads 25. Encircling the sleeve 22 are a pair of axially spaced anti-friction ball bearing units 26, 27. The inner race 28 of the uppermost bearing unit 27 abuts a ring-like washer 29 which in turn abuts the hub 23 of the steering wheel 24. A spaced ring 30 is employed to maintain the bearing units 26 and 27 axially spaced with respect to each other. A nut 31 is adapted to be threaded on the external threads 25 to maintain the bearing units 26 and 27 assembled on the sleeve 22. In order to rotatably mount the steering wheel 24 on the upper end of the steering column 16 the sleeve 22 with the anti-friction bearings 26 and 27 mounted thereon is inserted in the upper end of the steering column 16. A helical wound compression spring 32 bears against the bottom of the nut 31 and has its opposite end abutting an annular radially inwardly extending spring seat 33 which is rigidly fastened to the interior of the steering column 16. A cap nut 34 has a portion thereof provided with internal threading which cooperates with external threading formed on the uppermost terminal end of the steering column 16. The cap nut 34 is provided with a radially inwardly extending annular flange 35 which is adapted to bear against the outer race of the uppermost anti-friction bearing unit 27 to force the sleeve 22 downwardly against the resilient action of the compression spring 32 to the position shown in Figure 2. From the foregoing it will be appreciated that the steering wheel 24 is rotatably mounted on the steering column 16 which in turn is rigidly secured to the vehicle body.

As best shown in Figures 2 and 3 a ring 37 is disposed within the sleeve 22 adjacent the upper end thereof. The outer surface of the ring 37 is radially spaced from the inner surface of the sleeve 22 and is provided with a pair of diametrically disposed semi-spherical depressions 38 which are positionable to be in radial alignment with similar diametrically disposed semi-spherical depressions 39 provided in the inner surface of the sleeve 22. Each depression 38 cooperates with a respective depression 39 to form a pocket for a ball 40. It will be appreciated that the ball 40 key the ring 37 and the sleeve 22 together wherein they are constrained to rotate in unison but are permitted to pivot angularly with respect to each other about an axis extending through the centers of the balls 40 and perpendicular to the rotational axis of the steering wheel 24. In a similar manner the outer surface of a sleeve 41 disposed coaxially with respect to the ring 37 is provided with diametrically disposed semi-spherical depressions 42 which cooperate with diametrically disposed depressions 43 formed on the inner surfaces of the ring 37 at points oriented at 90° from the depressions 38 to provide pockets for a pair of balls 44. From the foregoing it will be appreciated that the steering wheel 24, sleeve 22, ring 37 and sleeve 41 are constrained to rotate in unison but the sleeve 41 is capable of pivoting angularly with respect to the steering wheel 24 about axes extending through the balls 40 and the balls 44. In other words the sleeve 41 is connected to the steering wheel 24 for universal movement with respect thereto but is incapable of rotating independently of the steering wheel 24.

As in conventional steering gear mechanisms the present invention contemplates the utilization of an elongated steering shaft 45 and a gear reduction unit 46 for transmitting the manual rotational effort applied to the steering wheel 24 to the steering arm 47. One end of the steering arm 47 is connected to a drag link 48, partially shown in Figure 1, which, in turn, is operatively connected to the vehicle steerable wheels, not shown. The gear reduction unit 46 includes a worm 49 rigidly secured to the lower end of the steering shaft 45 and rotatably secured within the gear reduction unit housing 17 by bearings 50. The worm 49 meshes with a worm gear 51 which is affixed to a shaft 52. One end of the steering arm 47 is clamped to a portion of the shaft 52 as shown in Figures 1, 4 and 5. The gear reduction unit casing 17 instead of being rigidly connected to the side sill member 11 as in conventional steering gear mechanism installations is supported thereon for pivotal movement about a longitudinally extending axis designated by numeral 53. The upper end of the steering shaft 45 is provided with splines 54 which cooperate with internal splines formed in the sleeve 41 to drivingly connect the steering shaft and sleeve 41 together. From the foregoing it will be appreciated that the steering shaft 44 can move axially with respect to the steering wheel 24 because of the splined connection between the sleeve 41 and the steering shaft 45 and angularly with respect to the steering wheel 24 because of the universal connection between the sleeve 41 and the steering wheel 24. However, the relative movement permitted between the steering shaft 45 and the steering wheel 24 does not effect the function of the steering wheel 24 to control the direction of the vehicle.

As stated hereinbefore, the gear reduction unit casing 46 is mounted on the sill member 11 for pivotal movement with respect thereto and this is accomplished by providing the casing 17 with a pair of oppositely extending diametrically disposed pins 55 and journalling each pin in a bearing portion 56 of a respective one of a pair of brackets 57. The brackets 57 are longitudinally spaced and are rigidly fastened to the channel portion 58 of the side sill member 11 by means of bolts 59 and nuts 60. The axis 53 about which the casing 17 can rock with respect to the side sill member 11 is perpendicular to the rotational axis of the shaft 52 and spaced and parallel to the neutral or longitudinal median line of the vehicle chassis frame 10. The importance of mounting the housing 17 as pointed out hereinabove will be apparent presently. It will be appreciated that the lower end of the steering shaft 45, while capable of rotating with respect to the housing 17 to control the position of the ground-engaging wheels, is incapable of moving angularly or axially with respect to the housing 17 but since the housing is pivotally connected to the side sill member 11 the lower end of the shaft also is capable of pivoting about axis 53 with respect to the side sill member 11.

In the operation of motor vehicles over an uneven terrain or road surface irregularities oftentimes one or more ground engaging wheels are elevated to a different level than the other wheels with the result that severe torsional stresses and forces are imposed on the chassis frame. The chassis frames are generally designed and constructed in such a way that they are relatively flexible and therefore capable of relieving the torsional forces by distortion of the frame side sill members without damage to the chassis frames. Various body mounting means have been devised for mounting the operator's compartment on the flexible frame whereby the distorting forces and shock to which the frame is subjected are not directly and fully transmitted to the operator's compartment to cause deformation and ultimate breakage of the sheet metal parts thereof. This usually accomplished by permitting the various components of the chassis frame to move relatively to the operator's compartment. Heretofore it has been the practice to secure a part of the steering gear mechanism such as the steering column to the chassis frame as well as to the operator's compartment. As a result the vehicle cab was permitted to twist and bend with respect to the chassis frame when the chassis frame was subjected to torsional forces, but the steering gear mechanism interconnecting the vehicle operator's compartment and chassis frame as well as the connections per se between the steering gear mechanism and the chassis frame and operator's compartment were deformed, fatigued and ultimately broken since the steering gear mechanism was not designed to accommodate the relative movement between the operator's compartment and the chassis frame. Fig. 7 graphically illustrates the shortcomings of prior art steering mechanisms and the manner in which the present invention overcomes such shortcomings. As an example, in a case of prior art steering mechanism installations, as the side sill member 11 moves about the neutral axis of the chassis frame 10 in a counterclockwise direction as viewed in Fig. 7 the gear reduction unit 46 also moves therewith. Inasmuch as the lower end of the steering shaft 45 is angularly fixed with respect to the gear reduction unit and thus moves therewith, the lower end of the steering shaft 45 is in the broken line position shown in Figure 7. Numeral 61 designates the generally vertical plane in which the steering shaft 45 is disposed normally when the frame 10 is not subjected to vibrations, shocks and strains and the side sill members are in a horizontal plane. Obviously, in prior art steering gear mechanism installations, when the lower end of the steering shaft 45 moves to the broken line position, the steering shaft, steering column, and steering wheel would also have to move so as to be disposed in an inclined plane designated by numeral 62 in Figure 7, and the means for connecting the steering column to the vehicle body would have to accommodate such movement or the connecting means and the various components of the steering gear mechanism would be over stressed and strained. As illustrated in Figure 8, because the lower end of the steering shaft 45 in effect is pivotally supported by the chassis frame, the steering shaft remains substantially in the same vertical plane 61 during relative twisting of the side sill members 11 and 12 with respect to each other in the present invention. It is believed clear that the steering shaft 45 will remain substantially in the same vertical plane 61 regardless of the relative position of the side sill members with respect to the horizontal plane containing the side sill members 11 and 12 and the neutral axis when the chassis frame 10 is not subjected to vibrations, shocks, and strains. This is accomplished by connecting the lower end of the steering shaft to the side sill member 11 as pointed out hereinbefore, and by connecting the upper end of the shaft whereby angular movement of the shaft is permitted with respect to the steering wheel 24. Raising or lowering of side sill member 11 with respect to side sill member 12 causes shortening and lengthening of the distance between the gear reduction unit housing 17 and the steering wheel 24 respectively. By providing the spline connection between the steering wheel and the steering shaft 45 the spacing between the housing 17 and the steering wheel 24 may be varied without over stressing the various parts of the steering gear mechanism and without impairing the operation of the steering gear mechanism to control the position of the steering ground engaging wheels. Furthermore, annoying vibrations, noises, etc., are not transmitted from the steering shaft 45 to the steering wheel 24 since the steering wheel is mounted on the steering column, which, in turn, is only supported by the vehicle body and the means for interconnecting the steering shaft 45 to the steering wheel in effect dissipate such vibrations and noises.

The embodiment of the invention chosen for the purposes of illustration and description herein is that preferred for achieving the objects of the invention and developing the utility thereof in a most desirable manner, due regard being had to existing factors of economy, simplicity of design and construction and the improvements sought to be effected. It will be appreciated, therefore, that the particular structural and functional aspects emphasized herein are not intended to exclude but rather to suggest such other modifications and adaptations of the invention as fall within the spirit and scope of the invention as defined in the appended claims.

What is claimed is:

1. In a vehicle having a chassis frame and a body supported by said frame for control relative movement therebetween, the combination comprising. a hand steering wheel rotatably mounted on said body; a rotatable steering shaft having gear means fixed to one end thereof; means for operably connecting the opposite end of said shaft to said steering wheel for rotation in unison therewith, said means permitting said shaft to move angularly and axially with respect to said steering wheel, a housing for rotatably supporting said gear means; and means for pivotally supporting said housing on said chassis frame for pivotal movement therebetween about a longitudinally extending axis spaced from and parallel to the longitudinal median line of said frame.

2. In a vehicle substantially as set forth in claim 1, in which, said means for operatively connecting the opposite end of said shaft to said steering wheel for rotation in unison therewith includes a sleeve carried by said steering wheel constrained to rotate in unison therewith, said sleeve having internal splines cooperable with external splines formed on an end of said steering shaft whereby said sleeve and steering shaft are constrained to rotate together but can move axially with respect to each other.

3. In a vehicle having a chassis frame and a body mounted on said chassis frame for control relative movement therebetween, the combination comprising, a hand steering wheel rotatably mounted on said body, a steering shaft having a worm gear fixed to one end thereof; means for operably connecting the opposite end of said shaft to said steering wheel for rotation in unison, said means permitting said shaft to move angularly and axially with respect to said steering wheel; a housing for rotatably supporting said worm gear; and means for pivotally supporting said housing on said chassis frame for pivotal movement therebetween about a longitudinally extending axis, spaced from and parallel to the longitudinal median line of said chassis frame.

4. In a vehicle substantially as set forth in claim 3, in which, said means for operatively connecting said shaft to said steering wheel for rotation in unison therewith includes a first sleeve fixed to said steering wheel, and a second sleeve connected to said first sleeve for universal movement therebetween, said second sleeve having internal splines cooperable with external splines formed on an end of said shaft whereby said second sleeve and steering shaft are constrained to rotate together, said first and second sleeves being angularly movable with respect to each other.

5. In a vehicle having a chassis frame and a body supported by said frame for control relative movement therebetween, the combination comprising, a tubular steering column mounted on said body; a hand steering wheel rotatably mounted on one end of said column; a gear reduction unit including a housing mounted on said chassis frame for pivotal movement about a longitudinally extending axis spaced from and parallel to the longitudinal median line of said frame; a steering shaft extending through said tubular steering column having one end operably connected to said gear reduction unit, said one end of said shaft being pivotal with said gear reduction unit housing relatively to said frame; and means for operably connecting said shaft to said steering wheel for rotation in unison therewith, said means permitting said shaft to move angularly and axially with respect to said steering wheel.

6. In a vehicle substantially as set forth in claim 5, in which, said means for operatively connecting said shaft to said steering wheel for rotation in unison therewith includes a sleeve carried by said steering wheel constrained to rotate in unison therewith, said sleeve extending into said steering column and having internal splines cooperable with external splines formed on an end of said shaft whereby said sleeve and steering shaft are constrained to rotate together but can move axially with respect to each other.

7. In a motor vehicle having a chassis frame and a body mounted by said frame for control relative movement therebetween, the combination comprising, a tubular steering column fixedly mounted on said body; a hand steering wheel rotatably mounted on the uppermost end of said column; a gear reduction unit including a housing pivotally mounted on said chassis frame for pivotal movement about a longitudinally extending axis spaced from and parallel to the longitudinal median line of said frame, said gear reduction unit including a rotatable worm gear; a steering shaft having its lower end fixed to said worm gear, said lower end of said shaft being pivotal with said housing relatively to said frame; and means for operatively connecting the upper end of said shaft to said steering wheel for rotation in unison, said means permitting said shaft to move angularly and axially with respect to said steering wheel.

8. In a motor vehicle substantially as set forth in claim 7, in which, said means for operatively connecting the upper end of said shaft to said steering wheel for rotation in unison includes a sleeve carried by said steering wheel constrained to rotate in unison therewith, said sleeve extending into said steering column and having internal splines cooperable with external splines formed on the upper end of said steering shaft whereby said sleeve and steering shaft are constrained to rotate together but can move axially with respect to each other.

9. In a motor vehicle having a chassis frame and a body supported by said frame for controlled relative movement therebetween, the combination comprising, a tubular steering column fixed to said body; a hand steering wheel rotatably mounted on the upper end of said steering column, said hand steering wheel including a hub portion having a first sleeve fixed thereto and disposed within said steering column; a gear reduction unit including a housing mounted on said chassis frame for pivotal movement about a longitudinal extending axis spaced from and parallel to the longitudinal median line of said frame; a steering shaft extending through said tubular steering column having its lower end operatively connected to said gear reduction unit, said lower end of said shaft being pivotal with said gear reduction unit housing relatively to said frame; and means for operatively connecting the upper end of said steering shaft to said steering wheel for rotation in unison therewith, said means permitting said shaft to move angularly and axially with respect to said steering wheel and including a second sleeve connected to said first sleeve for universal movement therebetween, said second sleeve having internal splines cooperable with external splines formed on the upper end of said steering shaft whereby said second sleeve and steering shaft are constrained to rotate together but can move axially with respect to each other, and said first and second sleeves are constrained to rotate in unison but can move angularly with respect to each other.

References Cited in the file of this patent

UNITED STATES PATENTS

| | | |
|---|---|---|
| 784,042 | Fowler | Mar. 7, 1905 |
| 1,348,997 | Hunt | Aug. 10, 1920 |
| 1,425,765 | Hannum | Aug. 15, 1922 |
| 1,525,139 | Link | Feb. 3, 1925 |
| 1,865,130 | Moorhouse | June 28, 1932 |
| 1,998,735 | Rasmussen | Apr. 23, 1935 |
| 2,511,165 | Lyman | June 13, 1950 |
| 2,518,175 | Pinardi | Aug. 8, 1950 |
| 2,685,212 | Nallinger | Aug. 3, 1954 |
| 2,770,981 | Fieber | Nov. 20, 1956 |
| 2,836,988 | Cashman | June 3, 1958 |
| 2,845,810 | Sampson | Aug. 5, 1958 |